Dec. 2, 1947. W. N. NOVISS 2,431,957
PISTON PACKING
Filed Jan. 24, 1944
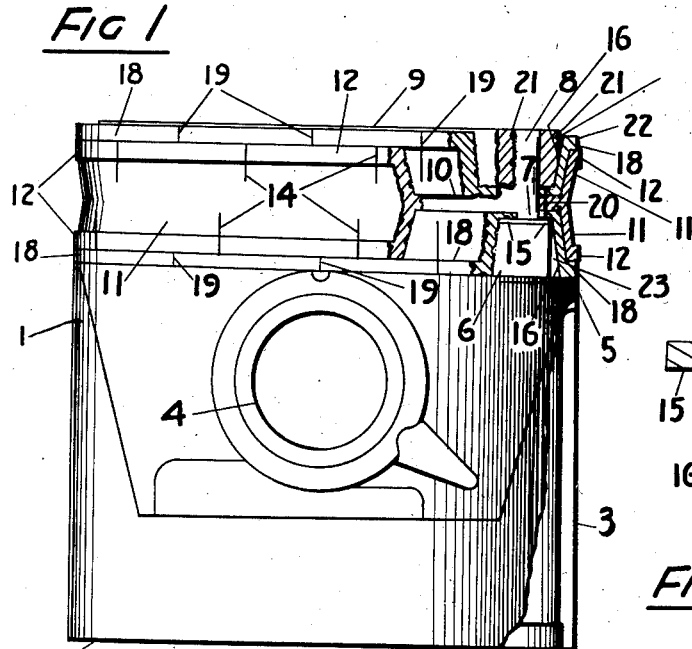
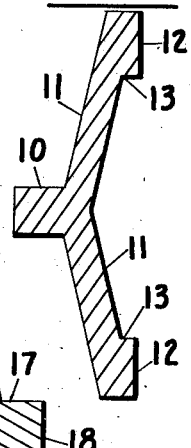
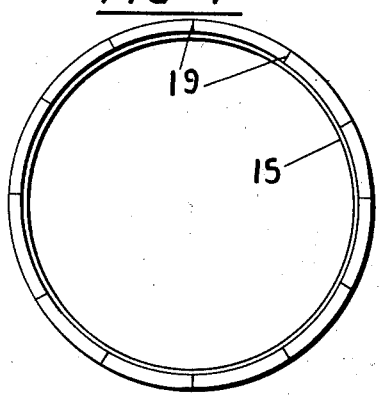
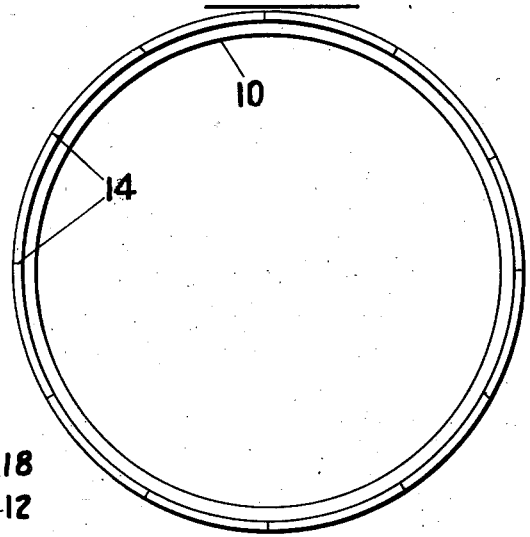
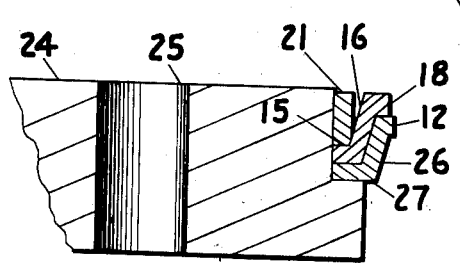
Inventor
William N. Noviss
By
Attorney Patented Dec. 2, 1947

2,431,957

UNITED STATES PATENT OFFICE 2,431,957

PISTON PACKING

William N. Noviss, Toledo, Ohio

Application January 24, 1944, Serial No. 519,486

2 Claims. (Cl. 309—29)

This invention relates to the efficient packing of pistons, as to the cylinders in which reciprocable, by means of endless or complete annulus type of piston rings.

This invention has utility when incorporated in kerfed endless rings, more particularly as having the endless ring portion away from the kerfed portion and with the kerfed portion providing the direct bearing or packing with the cylinder. With a Y or T-type cross section ring and a Z-type cross section ring, such may be nested and assembled as a group.

Referring to the drawings:

Fig. 1 is a side elevation, with parts broken away, of an embodiment of the invention in a trunk type of piston of the expansible skirt type for internal combustion engines;

Fig. 2 is a section, on an enlarged scale, of the major or T-cross section ring for packing the piston in Fig. 1;

Fig. 3 is a section, also on an enlarged scale, of one of the minor or Z-cross section packing rings in Fig. 1;

Fig. 4 is a view on a less scale than in Fig. 1, looking axially of a minor packing ring of Fig. 1;

Fig. 5 is an axial view of a major ring in Fig. 1; and

Fig. 6 is a detail in section of a pump piston and two-part ring.

A piston 1 has a skirt portion 2, a kerf 3, and a piston pin bearing 4. A shoulder 5 has therefrom a cylindrical portion 6 to an additional shoulder 7 to a terminal cylindrical portion 8 at explosion or compression end 9 of the piston 1.

Under the invention herein, a ring 10 is an inwardly extending flange or stem to a V-cross section member, having cross portion or arms 11 to terminal heads or cylinder contacting wear portions 12, slightly outwardly offset by ledge 13 from the cross arm portion 11. The cross arm portion 11, instead of being perpendicular to the stem 10, may have a slight outward flare. Kerfs 14 are thru the portions 12 and into the portions 11 nearly to the stem 10, in thereby providing yieldable or expansible wing portions for the major ring between the kerfs 14 thereof.

A ring 15 is an inwardly projecting flange from a lateral extent web portion 16 having a reverse or Z-type offset 17 parallel to the flange 15. The offset or flange portion 17 extends to provide a cylinder contacting face or wear portion 18. Kerfs 19 thru the portions 18, 17, and along the portion 16 toward the ring 15, establish for the minor or Z-cross section expansible endless ring, yieldable portions between the kerfs 19.

In carrying out more efficient practices hereunder, instead of installing a single ring, the T-ring 10, 11, 12, 13, 14, may have a ring 15 on each side of its stem 10. With an assembly pin 20 thru the three rings of one V and two Z-type, a composite unit is established with the respective kerfs 14, 19 staggered. The course as preferred is to shrink such unit over the portion 8 against the shoulder 7. A ring 21 is then shrunk or driven upon the piston portion 8. The resulting product is an efficiently packed cylinder and piston. In the compression or explosion stroke of the piston, there is a slight clearance 22 between the outer face of the ring 21 and the flare or web portion 16 of the adjacent Z-cross section ring. As the pressure builds up in this clearance region 22, the sections of the rings 18, 17, 16, have an outward give or yield to ride against the internal face of the cylinder. Were this Z-ring device omitted, this expansion performance would be directly against the yieldable portions 12, 11, between the kerfs 14 of the major ring 10. Opposite direction of piston stroke packing is effected in the two-direction embodiment of this three ring unit. The Z-ring 15, 16, 17, 18, with its kerfs 19 as in the assembly away from the piston end 9 and toward the skirt 2, has its give or expansion from pressure fluid entrance to clearance region 23. These kerf permitted lift regions of the Z-ring 15, 16, 17, 18, thus transmit or have secondary expansion upon the staggered kerf expansible sections 11, 12, as nesting therewith. There is experienced extended performance with no detraction from the pressure-holding functioning. The faces 12, 18, while exposed to wear, do not seem readily to depart from effective working condition.

With the web portions 11 and 16 as extending laterally from the respective endless ring portions 10, 15, at a slight flare, there is initially slight clearance 22 from the outer portion of the sleeve or collar 21. Likewise adjacent the shoulder 5, the cylindrical portion 6 initially has a slight clearance 23. The pressure fluid entering on the sides of these webs toward the walls of the piston, thereby has such pressure expand the kerfed portions of the rings to throw the wear faces 12, 18, outward toward the cylinder wall. The kerfs 19, 14, permit this piston ring packing expansion. The staggered relation between the kerfs 19, 14, maintains such peripheral that there is no blow past this packing. Efficient holding of pressures is had. The smooth wearing of the faces 12, 18, show that there is area of contact. The peripheral uniformity of the wearing as disclosed on the faces 12, 18, seems close to negligible and has established long life for the three part unit as herein disclosed. From this mode of performance, the side of the packing rings toward the piston body is a shrinking to a pressure tight assembly. In the absence of pressure, the packing may be such as to permit the piston to move rather freely. However, at once pressure be encountered, the snug fitting action of the arc wear face portions 12, 18, come into service automatically to hold such pressure, and with a minimum of binding or friction response.

For a push or pull type of piston 24 (Fig. 6), adapted to receive a piston rod thru opening 25, there may be an assembly of two Z-shaped rings 15, 16, 17, 18, and such to nest or fit with a half of the Y-ring or Z-ring 12, 26, 27, which as a pinned-together unit may be thrust to the shoulder on the piston 24 and so anchored by the collar or sleeve 21 fixed therewith. In the preferred practice hereunder, there is desired a normal flare or enlargement for the wear sections 12, 18, between the kerfs 14, 19, and this in the range .002" larger diameter than the inside of the cylinder, provides an initial fitting relation for the proper assembly and use.

What is claimed and it is desired to secure by Letters Patent is:

1. A piston ring unit comprising first and second ring sections, said first ring section having an inwardly cylindrical face and the second ring section having an outwardly relatively concentric cylindrical face, said second ring section being of greater diameter and axially spaced from and parallel to the first ring section, and an outwardly flaring connecting web integral with the first and second ring sections having its innerless diameter portion merging into the outer portion of the first ring section and its larger diameter portion merging into the inner portion of the second ring section, said second ring section having kerfs extending into the web, said cylindrical faces being bounded by radial faces.

2. A piston ring unit comprising first, second and third ring sections, said first ring section having an inwardly cylindrical face, and oppositely laterally therefrom said second and third ring sections having outwardly cylindrical faces of similar diameter and greater than the diameter of the first ring inward face, said rings being concentric and parallel, and outwardly flaring connecting web means merging into the outer portion of the first ring section at the minor diameter of the web means, said web means major diameter merging with the inner portion of the respective second and third ring sections, said second and third ring sections each having kerfs extending therefrom into the web means toward the first ring section, there being a common axis for the ring sections having perpendicular thereto parallel planes in which are bounding faces for the said ring sections.

WILLIAM N. NOVISS.

REFERENCES CITED

The following references are of record in the file of this patent:

UNITED STATES PATENTS

| Number | Name | Date |
| --- | --- | --- |
| 458,130 | Price | Aug. 18, 1891 |
| 1,478,561 | Faessel | Dec. 25, 1923 |
| 1,554,536 | Tartrais | Sept 22, 1925 |
| 1,616,310 | Esnault-Petterie | Feb. 1, 1927 |
| 1,784,505 | Teetor | Dec. 9, 1930 |
| 2,157,299 | Mercier | May 9, 1939 |

FOREIGN PATENTS

| Number | Country | Date |
| --- | --- | --- |
| 123,351 | Great Britain | June 24, 1918 |